United States Patent
Shurtleff

(10) Patent No.: US 6,440,298 B1
(45) Date of Patent: *Aug. 27, 2002

(54) METHOD OF RECLAIMING WASTE OIL

(75) Inventor: Edward Carlton Shurtleff, St. George (CA)

(73) Assignee: Patent Holdings Ltd., Grand Turk (TC)

( * ) Notice: Subject to any disclaimer, the term of this patent is extended or adjusted under 35 U.S.C. 154(b) by 0 days.

This patent is subject to a terminal disclaimer.

(21) Appl. No.: 08/413,193

(22) Filed: Oct. 11, 2000

Related U.S. Application Data

(63) Continuation of application No. 08/132,612, filed on Oct. 6, 1993, now abandoned, which is a division of application No. 07/712,761, filed on Jun. 10, 1991, now Pat. No. 5,271,808, which is a continuation-in-part of application No. 07/246,834, filed on Sep. 20, 1988, now abandoned.

(51) Int. Cl.⁷ ............................. C10G 9/06; C10G 7/00
(52) U.S. Cl. ....................... 208/179; 208/184; 208/131
(58) Field of Search ................................ 208/177, 179, 208/180, 182, 184, 185, 186, 15, 18, 349, 353, 131

(56) References Cited

U.S. PATENT DOCUMENTS

| | | | |
|---|---|---|---|
| 101,365 A | 3/1870 | Hill et al. ................... | 196/106 |
| 135,673 A | 2/1873 | Tait et al. ................... | 196/100 |

(List continued on next page.)

FOREIGN PATENT DOCUMENTS

| | | |
|---|---|---|
| AU | 163082 | 5/1953 |
| CK | 154304 | 8/1974 |
| CK | 208333 | 7/1980 |
| CK | 198671 | 11/1982 |
| CS | 259521 | 3/1988 |
| DE | 712748 | 10/1941 |
| DE | 2900342 | 6/1980 |
| EP | 360500 | 3/1990 |
| FR | 2434865 | 3/1980 |
| FR | 3121246 | 12/1982 |
| JP | 166105 | 8/1944 |
| JP | 48-102104 | 12/1973 |
| JP | 52-139106 | 11/1977 |
| JP | 55-164291 | 12/1980 |
| JP | 63-15888 | 1/1988 |
| NL | 7711298 | 4/1979 |
| NZ | 187082 | 6/1978 |
| NZ | 184277 | 8/1980 |
| WO | 90/09426 | 8/1990 |
| WO | WO 92/22624 | 12/1992 |
| WO | WO 94/11471 | 5/1994 |

OTHER PUBLICATIONS

Czech Certificate of Authorship, 208, 333, Jun. 1982.*
Czech Certificate of Authorship, 198, 671, Nov. 1982.*
Czech Certificate of Authorship, 154, 304, Aug. 1974.*
Chemistry and Technology of Crude Oil, SNTL, Bratislava, 1963, p. 12 (Doc. 4).
Technical Encyclopedia, SNTL Praha 1, 1981 (Doc. 5).
Newspaper Article: Undated—name of publication unknown, entitled Boundless potential for invention which turns waste oil into fuel by Reed Haley, Staff Writer; inventor's picture on sheet captioned "Liquid Gold—Ed Shurtleff and his amazing mini refinery . . .".

(List continued on next page.)

Primary Examiner—Bekir L. Yildirim
(74) Attorney, Agent, or Firm—H. Samuel Frost; Bereskin & Parr

(57) ABSTRACT

An apparatus and a method are provided reclaiming a useful oil product from waste oil, such as used lubricating oil. The apparatus comprises an oil feed means, a boiler, a heater and a separating means. The heater is used to heat the waste oil in the boiler to a temperature such that lighter hydrocarbons remain unvolatilized, trapping contaminants therewith. The separating means separates the volatilized lighter hydrocarbons from the unvolatilized heavier hydrocarbons and contaminants.

18 Claims, 9 Drawing Sheets

U.S. PATENT DOCUMENTS

| | | | |
|---|---|---|---|
| 443,660 A | 12/1890 | Goddu | |
| 887,605 A | 1/1908 | Sone | 196/124 |
| 1,310,874 A | 7/1919 | Reilly | 196/116 |
| 1,451,739 A | 4/1923 | Mayes | 196/106 |
| 1,459,515 A | 6/1923 | Penniman | 196/132 |
| 1,464,246 A | 8/1923 | Freeman | 196/106 |
| 1,546,055 A | 7/1925 | Wilson et al. | 196/111 |
| 1,650,887 A | 11/1927 | L. de Florez | 236/70 |
| 1,709,230 A | 4/1929 | Potter et al. | |
| 1,831,875 A | 11/1931 | Moreton | |
| 1,876,035 A | 9/1932 | Tennent | |
| 2,012,695 A | 8/1935 | Schillaber | 196/16 |
| 2,702,268 A | 2/1955 | Egger et al. | |
| 2,792,058 A | 5/1957 | Thomas et al. | |
| 3,717,569 A | 2/1973 | McAllister et al. | 208/42 |
| 3,923,643 A | 12/1975 | Lewis et al. | |
| 3,930,988 A | 1/1976 | Johnson | 208/182 |
| 3,954,602 A * | 5/1976 | Troesch et al. | 208/179 |
| 4,021,333 A | 5/1977 | Habiby et al. | |
| 4,071,438 A | 1/1978 | O'Blasny | |
| 4,101,414 A | 7/1978 | Kim et al. | |
| 4,127,393 A | 11/1978 | Timmins et al. | |
| 4,233,140 A | 11/1980 | Antonelli et al. | |
| 4,287,049 A | 9/1981 | Tabler et al. | 208/180 |
| 4,381,992 A | 5/1983 | Wood et al. | |
| 4,392,820 A | 7/1983 | Niederholtmeyer | |
| 4,247,389 A | 1/1984 | Johnson et al. | 208/181 |
| 4,431,523 A | 2/1984 | Tabler et al. | 208/182 |
| 4,431,524 A | 2/1984 | Norman | 208/183 |
| 4,452,671 A | 6/1984 | Oakes | |
| 4,457,805 A | 7/1984 | Pastor | |
| 4,460,328 A | 7/1984 | Niederholtmeyer | |
| 4,512,878 A * | 4/1985 | Reid et al. | 208/179 |
| 4,597,441 A | 7/1986 | Ware et al. | 186/261 |
| 4,666,587 A | 5/1987 | Martin | |
| 4,778,588 A | 10/1988 | Brandes et al. | 208/213 |
| 4,816,138 A | 3/1989 | Visser et al. | 208/179 |
| 4,824,556 A | 4/1989 | Brandes et al. | 208/143 |
| 4,831,004 A | 5/1989 | Brandes et al. | 502/220 |
| 4,882,037 A | 11/1989 | Kalnes et al. | 208/85 |
| 5,028,313 A | 7/1991 | Kalnes et al. | |
| 5,188,742 A | 2/1993 | Shurtleff | 210/774 |
| 5,244,565 A | 9/1993 | Lankton | |
| 5,248,410 A | 9/1993 | Clausen et al. | 208/131 |
| 5,271,808 A | 12/1993 | Shurtleff | 196/46 |
| 5,286,349 A | 2/1994 | Shurtleff | 196/46 |
| 5,302,282 A | 4/1994 | Kalnes et al. | 208/179 |
| 5,362,381 A | 11/1994 | Brown et al. | 208/179 |
| 5,382,328 A | 1/1995 | Drespa et al. | 202/235 |
| 5,397,459 A | 3/1995 | Butler | 208/179 |
| 5,796,462 A * | 8/1998 | Shurtleff | 208/182 |
| 4,151,072 A | 4/1999 | Nowack et al. | 208/182 |

OTHER PUBLICATIONS

Newspaper Article: Hand written name of publication "Telegraph Journal—Mar. 1, 1989" entitled "His machine converts waste oil into usable diesel–type fuel"; inventor's picture captioned "Likes Results—Ed Shurtleff, inventor of a machine that turns waste oil into diesel–type fuel . . .".

Article published in the Atlantic Business publication, May/Jun. 1989 entitled "Turning Garbage into Gold—Ed Shurtleff has built a machine . . ." with two photos of Mr. Shurtleff captioned "Ed Shurtleff shows off final . . .".

Newspaper Article: Saint Croix Courier, Tuesday, Nov. 14, 1990, entitled "Shurtleff saluted in House of Commons" by Barb Rayner.

Perry's Chemical Engineers' Handbook, Sixth Edition, Fig. 13–76, section 13–75.

Greases & Special Oils, editor VEDA, Bratislava 1980, p. 92.

Chemistry & Technology of Crude Oil, Editor SNTL Bratislava 1963, p. 270.

Common Chemical Technology, Phaha 1981, p. 59.

Newspaper Article: Undated photocopies of two articles on one sheet: name of publication unknown, one entitled "Award–Winning Inventor Says INVENTING AKIN TO HAVING A BABY" and "Shurtleff Wins Award"–both articles written by Sandy Morgan.

Newspaper Article: Undated article "INVENTOR'S REFINED IDEA IS MAKING FINE OIL" by Mac Trueman, The Evening Times Globe, Saint John (New Brunswick) with inventor's picture captioned "Ed Shurtleff with his mini–refinery . . .".

Newpaper Article: Publication and date unknown; article entitled "Waste Oil Refining Unit Approved for sale in United States Market", Dennis Brooks, Correspondent. Picture of various people with caption "A new machine that recycles used motor oils . . .".

Newspaper Article: The Brunswick Business Journal, Oct. 1990 entitled "THE INNOVATORS" by Eugene Walsh; picture of inventor captioned "Ed Shurtleff is an inventor stymied by red tape."

ASTM Standard D 975–89, Standard Specification for Diesel Fuel Oils, Jun. 1989.

OCL Services Ltd., Environmental Feasibility Study of the SX–302 Waste Oil Refiner, 1991.

Chemical Engineer's Handbook Ch. 13, ed Perry J. H. (Hungarian Edition), McGraw Hill 1969; pp. 1157–59, Fig. 13–45.

Sattler, Klaus; Termikus elválaszt́'si módszerek (Thermal Methods of Separation); Ch. 2; Budapest 1983; pp. 92–165.

L'Institut Francais du Pétrole, Le Petrole: Raffinage et Génie Chimique $2^{nd}$ Ed.; Editions Technip: Paris, 1972; p. 995.

"Manufacture of Lubricating Oils by Hyrocracking", Eight World Petroleum Congress, Proceedings, vol. 4, Manufacturing, 1971, by J. B. Gilbert and J. Walker.

Hobson, G. D. *Modern Petroleum Technology* (New York: Wiley, 1984) pp. 434–439 (by L. J. McPherson and M. F. Olive) and 598–607 (by S.A. Berridge).

* cited by examiner

METHOD OF RECLAIMING WASTE OIL

CROSS-REFERENCE TO RELATED APPLICATIONS

This application is a Continuation of my application No. 08/132,612 filed Oct. 6, 1993, now abandoned which in turn is a Divisional of my earlier application Ser. No. 07/712,761 filed Jun. 10, 1991, U.S. Pat. No. 5,271,808 which in turn was a Continuation-in-Part of my earlier application No. 07/246,834, filed Sep. 20, 1988 now abandoned.

FIELD OF THE INVENTION

This invention relates generally to an apparatus and a method for reclaiming waste oil, more particularly for removing various contaminants present in waste oil which make it unsuitable for re-use as a heating fuel, diesel fuel, and so forth.

BACKGROUND OF THE INVENTION

In this specification, the term "waste oil" encompasses any suitable oil, for example, mineral oil, which has been used as motor oil or some other lubricating oil, or as hydraulic oil or in some other such application. It is anticipated that these oils will have be en derived from mineral oil, but they could be, for example, animal or vegetable oil, i.e. such as fish oil or oil discarded by restaurants, etc. The mineral oil could be plain crude oil. In use, such lubricating oils are changed periodically. The drained and recovered waste oil typically contains substantial amounts of contaminants, which may include dirt, metallic particles (including heavy metals, such as molybdenum, chromium, vanadium, copper and so forth), oxides and salts, gasoline and gasoline additives (such as tetraethyl lead), as well as detergents and performance additives. It may also include water. The contaminants in crude oil usually make it unsuitable for most uses.

Many millions of gallons of such waste oil are produced annually in North America. In the past, waste oil has been used on dirt roads for dust control, or simply dumped in sanitary sewers or land fill sites. However, increasingly such methods of disposal are seen as being unacceptable causes of hydrocarbon pollution to the environment. Re-refining of waste oil is practised to a certain extent. However, known methods for re-refining waste oil require complex chemical treatments and generally do not produce a high grade product. Transportation costs further detract from the economic viability of this manner of dealing with waste oil.

In the past, it has also been proposed that waste oil be used as a heating fuel. However, furnaces of the known type for burning such oil have met with limited success. During conventional combustion of waste oil, a residue accumulates in the burner. The residue is formed of the various contaminants and the heavier hydrocarbon which form a hard binding resin. As a result, the burner must frequently be cleaned of the accumulated hard residue, typically twice per day. In order to clean the burner, the furnace must be turned off and allowed to cool. This is extremely inconvenient and represents major inefficiency. Furthermore, removal of the cooled and hardened residue from the burner is a difficult task typically requiring strenuous physical labour.

BRIEF SUMMARY OF THE PRESENT INVENTION

"In accordance with the present invention, there is provided a method for treating waste oil containing contaminants, the method comprising the steps of:

(a) heating said waste oil;
(b) at substantially atmospheric pressure, volatilizing a first portion of said waste oil, at a temperature sufficient to cause cracking of at least part of said first portion, said first portion containing primarily the lighter hydrocarbons of said waste oil, and separating the volatilized first portion from the remaining unvolatilized portion of said waste oil, said remaining portion containing primarily the heavier hydrocarbons and the contaminants of said waste oil;
(c) condensing said separated, volatilised first portion; and
(d) recovering said condensed first portion, substantially reduced in contaminants and having a substantially lower viscosity than said waste oil, and separately recovering said remaining portion. Preferably, the temperature is in the range of from about 600 to 800° F. Advantageously, the temperature is about 650° F. Most advantageously, the volatilized lighter hydrocarbons are subsequently condensed to produce a reclaimed liquid oil product, at. least a portion of which is then burned to heat more waste oil in the boiler.

The present invention provides a safe, efficient and versatile means for treating waste oil, reclaiming therefrom a useful petroleum product which can be used in a number of ways, particularly as a heating fuel or as diesel fuel. The sludge by-product derived from the heavier hydrocarbons and contaminants must still be disposed of. However, it should typically represent approximately only one-tenth of the volume of the waste oil fed to the apparatus. In some cases it may be possible to reclaim valuable metals from the sludge product.

An apparatus for carrying out the present invention can be manufactured and operated at a small fraction of the cost of a re-refining plant. Thus, industrial and commercial establishments (such as automobile service stations) and others who accumulate large quantities of waste oil can utilize the waste oil as a valuable by-product, rather than having to pay to have it disposed.

BRIEF DESCRIPTION OF THE DRAWINGS

In order that the invention may be more clearly understood, reference will now be made by way of example, to the accompanying drawings which illustrate the invention and in which.

DESCRIPTION OF PREFERRED EMBODIMENTS

Figure 1:
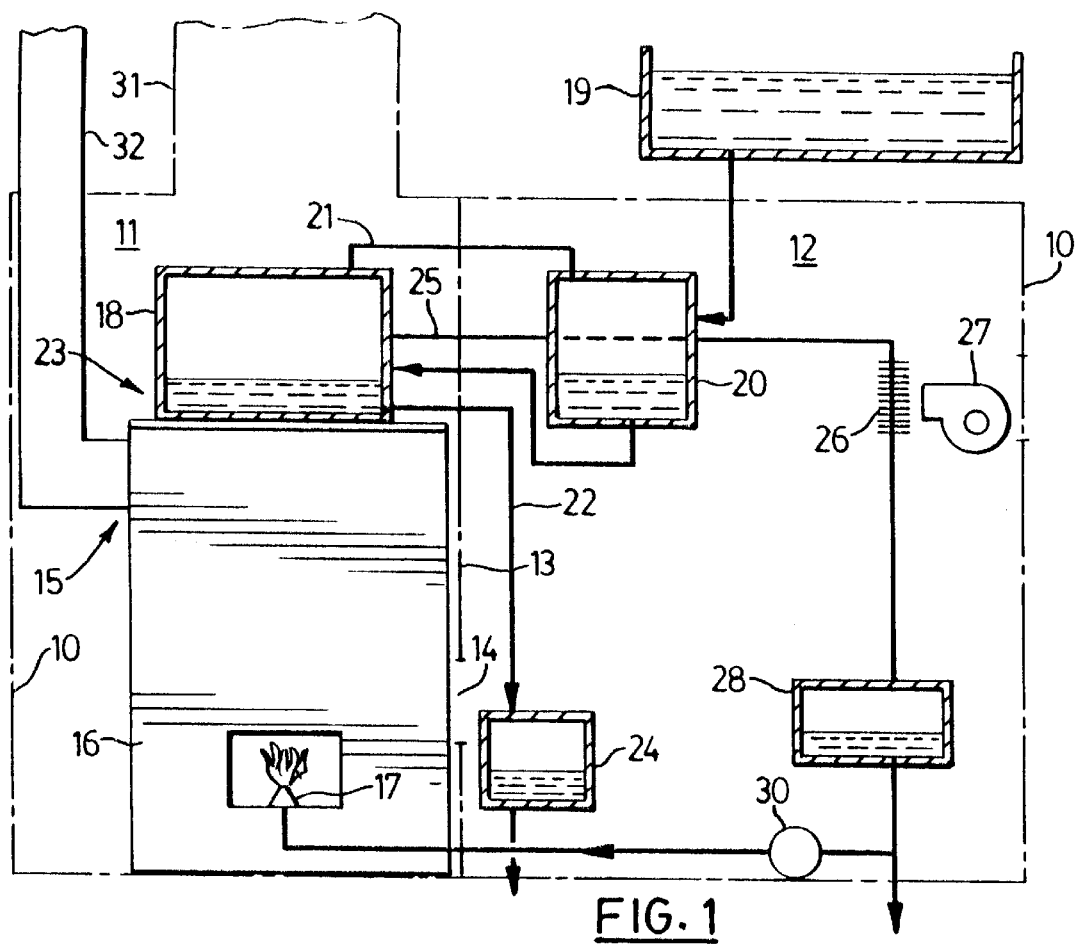
FIG. 1 is a schematic representation of one embodiment of the apparatus of the present invention.

Referring first to FIG. 1, the apparatus comprises a containment structure 10 having a first substantially enclosed chamber 11 and a second substantially enclosed chamber 12. The first chamber 11 and the second chamber 12 are substantially separated from each other by a common wall 13, but they fluidly communicate with each other through an opening 14 in the wall 13. A fire box 15 in the first chamber 11 comprises a separate fire chamber 16, including a burner 17, and a distillation boiler 18 in which the waste oil is heated. Waste oil is fed from a storage tank 19 through a float chamber 20 to the boiler 18. The oil level within the boiler 18 is controlled by the float chamber 20. The float chamber 20 is sealed but a breather tube 21 passes between the boiler 18 and the float chamber 20 to equilibrate pressure. The boiler 18 is located above the fire chamber 16 and the distance between them within the fire box 15 is such that, while the apparatus is operating (i.e., burning oil), the temperature at the height of the boiler 18 is approximately 650° F. At this temperature, the lighter hydrocarbons are volatilized and cracked and they exit the boiler 18 through a discharge 25. A sludge consisting of the unvolatilized heavier hydrocarbons and contaminants gradually builds up in the bottom portion 23 of the boiler 18. This sludge is emptied via a drain 22 into a sludge tank 24, and is ultimately disposed.

In the event that the sludge is not emptied, the level of the sludge and oil in the boiler 18 raises to the cut off level of the float chamber 20 and no further waste oil enters the boiler 18 and the apparatus is ultimately automatically shut down.

The volatilized lighter hydrocarbons form the boiler 18 pass through the discharge 25 then through a heat exchanger 26, positioned in front of a blower 27, where they are cooled and condensed. The heat given off by the heat exchanger 26 passes along in the air stream created by the blower 2f through the second chamber 12, and through the opening 14 into the first chamber 11, thus being recaptured for heating.

The condensed lighter hydrocarbons thus form a reclaimed liquid oil product which passes to a holding tank 28. From there the reclaimed oil can be emptied for use elsewhere or transferred to the burner 17, via a pump 30. The fire chamber 16 is similar to a fire chamber of a conventional oil furnace. Heat from the fire box 15 is transferred through the first chamber 11 to a heating duct 31 which connects to a building heating system. Combustion fumes pass out through a flue 32.

The furnace burner 17 may be a simple pot type burner. Alternatively, a gun type burner may be used. If a gun type burner is used, the reclaimed oil should be fed by means of a hydraulic pump maintained at a temperature of about 165° F. in a heated water bath, and an in-line heater should be used to maintain the nozzle temperature about 130° F., due to the viscosity of the reclaimed oil.

Figure 3:
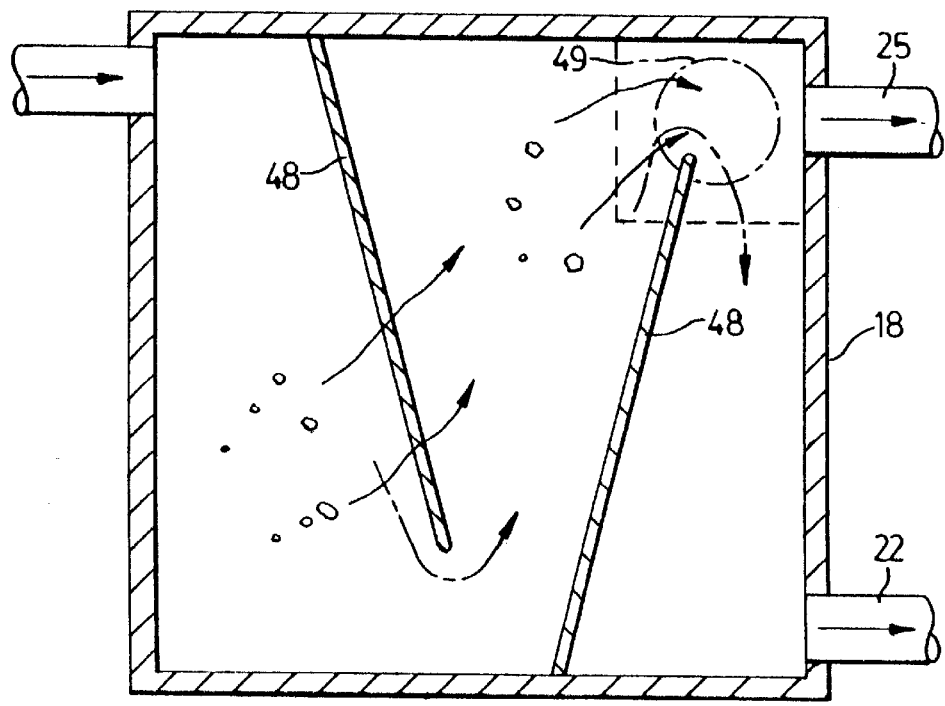
FIG. 3 is a top view representation of a portion of the apparatus of FIG. 2, taken along the plane indicated by line 3—3.
Figure 2:
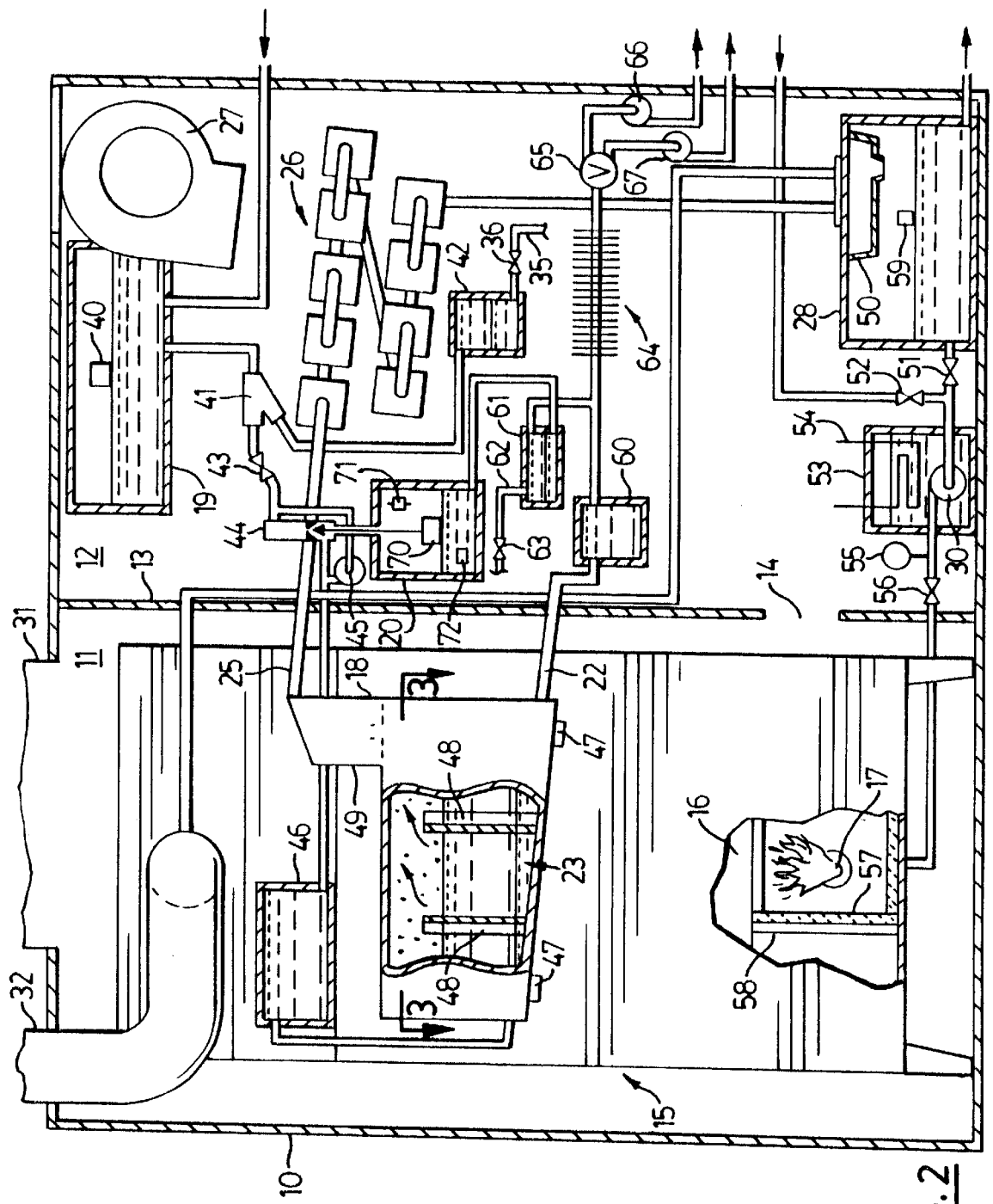
FIG. 2 is a cross-sectional side view representation of an a alternative embodiment of the apparatus of the present invention.

FIG. 1 shows a simple embodiment of the apparatus of the present invention in order to illustrate the basic operating principle. Turning to FIGS. 2 and 3, a preferred embodiment of an apparatus of the present invention will now be described. For the sake of simplicity and brevity, like parts are given the same reference numbers as used for the simple embodiment of FIG. 1 and a description of these parts is not repeated.

In this embodiment, the feed storage tank 19 is mounted within the containment structure 10. When the level of waste oil in the feed storage tank drops below a pre-set level, a float switch 40 activates a motorized pump to deliver more waste oil from external receiving-storage-settling tanks. When the power is turned on to start up the apparatus, a solenoid valve 43 is opened to permit flow from the feed storage tank and a motorized feed pump 45 is activated. Waste oil from the feed storage tank 19 first passes a "Y" strainer 41 which removes dirt particles and entrained water. Most of the water entrained with typical waste oils can be removed while the oil is being held in the external receiving-storage-settling tanks. The remaining entrained water which is diverted by the "Y" strainer drains into water trap tank 42 from which it can be periodically removed via a water drain 35 by opening a valve 36.

When the solenoid valve 43 is opened, waste oil is delivered via the feed pump 45 and also through a needle valve 44 to a pre-heater tank 46. The needle valve 44 can deliver waste oil at a rate of up to six gallons per hour. The feed pump delivers waste oil at a rate of approximately four gallons per hour, regardless of the flow rate though the needle valve. Thus, during operation, the feed rate of the waste oil varies from about four to about ten gallons per hour.

During operation, the pre-heater tank 46 heats the waste oil to about 200 to 300° F. From the pre-heater tank 46, the waste oil is transferred to the boiler 18. In this embodiment, the boiler 18 has an inclined base which rests on sliders 47 so that the boiler 18 can be removed from the fire box 15 like a drawer to facilitate periodic cleaning and so forth. Two inclined barriers 48 extend upwardly from the base and inwardly from the opposing sides of the boiler 18 such that the sludge which accumulates at the bottom 23 of the boiler 18 flows from side to side down the inclined base around the barriers 48. The volatilized lighter hydrocarbons exit through a raised portion 49 and thence through the discharge 25.

When the level of the waste oil in the boiler 18 reaches a pre-set height determined by a low level float 72 in the float chamber 20, a switch is activated to turn on the burner 17 and the fuel pump 30. The burner 17 thus begins to fire and heat up the fire box 15, including the boiler 18. The burner 17 is held in a refractory fire pot 57 which is supported by a fire pot support 58. The burner 17 can burn reclaimed oil from the holding tank 28 or from an external reserve of conventional fuel oil. Valve 51 for reclaimed oil and valve 52 for conventional fuel oil are manually opened and closed to select the fuel. The pump 30 is held in a water immersion tank 53 heated with an electric heating coil 54 to maintain the temperature in the immersion tank at approximately 165° F. Power to the heating coil 54 and to an in-line heater next to the nozzle of burner 17 is provided by an independent source so that the temperature of the fuel supply line, pump and burner is always maintained high enough to handle the apparatus' own reclaimed oil which has a higher viscosity than conventional furnace fuel oils. The fuel line pressure can be adjusted by means of a pressure relief valve 56 and can be monitored by means of a pressure gauge 55. It has been found that an operating pressure of approximately 120 p.s.i is desirable.

When the burner 17 and fuel pump 30 are activate the low level float switch 72, a coil relay also automatically shuts off the feed pump 45 and closes the solenoid valve 43. Thus, for the time being, no further waste oil is delivered to the apparatus. The waste oil already in the boiler 18 is gradually heated up by the heat from the burner 17 until it reaches the distilling temperature of approximately 650° F. At this temperature, lighter hydrocarbons are volatilized and pass out through the discharge 25 to the heat exchanger 26, while sludge builds up in the bottom 23 of the boiler 18 and gradually exits through the drain 22. As the volatilized lighter hydrocarbons are discharged and enter the heat exchanger 26, the temperature of the heat exchanger 26 rises. Increasing temperature of the heat exchanger 26. thus indicates that the waste oil in the boiler 18 has reached volatilization temperature. This is used as a signal to indicate that the apparatus is ready for steady state operation. A thermocouple mounted midway on the heat exchange 26 responds when the temperature reaches 130° F. by activating a coil relay to transfer the power to the burner 17 and fuel pump 30 to a different path for steady state operation. This path includes a sail switch which will turn off the power if the blower 27 stops operating for any reason. The thermocouple also opens the solenoid valve 43 and starts the feed pump 45 so that waste oil resumes flowing from the feed storage tank 19 through the pre-heater 46 and into the boiler 18. The oil level in the boiler 18 rises to a level pre-set by a float 70 of the float chamber 20. Float 70 controls the operating level in the boiler 18 by opening and closing the needle valve 44 to adjust the total feed rate. Typically, the apparatus runs at a steady state of about six to ten gallons per hour. The thermocouple on the heat exchanger 26 also turns on a sludge removal pump 66.

The holding tank 28 is provided with a pan 50 on the underside of its top where the condensed lighter hydrocarbons collect. A second tube extends from this region and connects to the flue 32 so that any remaining uncondensed volatiles entering the holding tank 28 are sucked away with the flue gases. In operation, only minute traces of volatiles have been found. A float switch 59 in the holding tank 28 activates a motorized pump which drains a portion of the reclaimed liquid oil from the holding tank 28 to an external storage tank if the depth in the holding tanks 28 exceeds a pre-set level.

The sludge passes from the drain 22 into a settling-cooling tank 60 and from there past a heat exchanger 64 and a solenoid valve 65 to a sludge pump 66. The sludge pump 66 drains sludge to an external sludge storage tank at a rate of about 0.5 to 0.7 gallons per hour. The solenoid valve 65 directs the flow through one of two emanating branches. The solenoid valve 65 is biased to direct flow normally though the branch leading to the sludge pump 66. However, it may be activated to direct the flow to a shut down pump 67 instead. A "T" connects into the sludge draining line between the settling-cooling tank 60 and the heat exchanger 64, and leads to a transfer tank 61 and thence to the float chamber 20. The transfer tank 61 has an air release tube 62 with a valve 63 to release entrapped air and is included to reduce heat transfer to the float chamber.

When the apparatus is manually switched off, power is cut to the feed pump 45 and the sludge pump 66, and solenoid valve 43 is closed. The apparatus continues to operate, however, until the oil level in the boiler 18 is reduced to the level of the low level float switch 72.

At this point, the low level float switch cuts power to the burner 17 and to the fuel pump 30. The apparatus then sits cooling for approximately two hours. When the temperature of the sludge in the drain 22 just upstream of the settling-cooling tank 60 has cooled to 140° F., a thermocouple activates solenoid valve 65, closing the branch leading to the sludge pump 66 and opening the leading to the shut down pump 67, and turns on the shut down pump 67. The sludge and any remaining oil is then completely drained from the apparatus by the shut down pump 67 to the external sludge storage tank. When the temperature of the sludge drain 22 just upstream from the first settling-cooling tank 60 has cooled to 100° F., indicating that the line is empty, a thermocouple reverses solenoid valve 65 and turns off shut down pump 67.

If the apparatus should run out of waste oil or develop a blockage in the feed line, the oil level in the boiler 18 will be lowered to the level of the low level float switch 72. This cuts power to the burner 17 and the fuel pump 30, and turns of the feed pump 45 and closes solenoid valve 43. The apparatus cools and is drained in the manner previously described.

If a blockage were to develop downstream, the oil in the boiler 18 would reach the level of a high level float switch 71. This also cuts power to the burner 17 and the fuel pump 30, and turns off the feed pump 45 and closes the solenoid valve 43. Again, the apparatus sits and cools and then drains itself.

High limit controls on the fire box 15 and on the heat exchanger 26 also similarly automatically shut off the apparatus if local temperatures exceed pre-set limits, which could occur, for example, if improper petroleum products such as gasoline are in inadvertently added to the feed storage tank 19.

EXAMPLE 1

This example illustrate the operability and efficiency of the invention.

A prototype apparatus substantially as illustrated in FIG. 1, with a pot burner, was tested according to the following procedure. A 25 gallon sample of a typical used motor oil obtained from an automotive service station was introduced to the feed storage tank, float chamber and boiler. The apparatus was started up using 2 cups (16 oz.) of a conventional No. 1 fuel oil (kerosene). The fire chamber was heated such that the temperature of the boiler approached 650° F., and the apparatus was operated continually for 24 hours. During operation, the apparatus consumed approximately 4.25 Imperial gallons per hour of waste oil. Of this amount, approximately 0.75 Imperial gallons per hour was consumed by combustion in the fire chamber, producing approximately 150,000 BTU/hour for heating. Approximately 3.1 Imperial gallons/hour of additional reclaimed oil was accumulated in the holding tank, and approximately 0.4 Imperial gallons/hour of sludge was accumulated in the sludge tank.

EXAMPLE 2

This example further illustrate the operability and efficiency of the invention.

A prototype apparatus substantially as illustrated in FIG. 1 was tested according to a procedure similar to that described in Example 1, under conditions as shown in Table 1. Chemical and physical analyses were conducted on the waste oil feedstock, the reclaimed oil and the sludge, and the results are shown in Table 2.

TABLE 1

Operating Conditions for Example 2

| Times: | |
| --- | --- |
| start-up to start of reclaimed oil production = | 4 h approx. |
| time to produce 35 gal of reclaimed oil = | 6 h approx. |
| Total = | 10 h approx. |
| production rate = | 3.6 g/h approx. |
| Temperature | |
| boiler during production = | 635° F. (335° C.) |
| boiler at end of production = | 645° F. (340° C.) |
| stack during production = | 595° F. (313° C.) |

TABLE 1-continued

Operating Conditions for Example 2

Material Balance

| | |
|---|---|
| waste oil feedstock volume = | 40 gal |
| total volume of reclaimed oil produced = | 36 gal |
| efficiency (percentage recovery of reclaimed oil) = | 90% |
| volume of reclaimed oil burned to sustain operation = | 0.7 gal/h appox. |
| sludge = | 3 gal |
| lost due to leaks and volatilization = | 1 gal approx. |

TABLE 2

Analytical Data for Example 2

| | Waste Oil Feedstock | Reclaimed Oil | Sludge |
|---|---|---|---|
| Appearance | Opaque black, mobile liquid | Clear, fluorescent yellow-orange mobile liquid | Opaque black viscous liquid |
| Odour | Acrid, penetrating | Acrid, penetrating | Acrid, penetrating |
| Water (%) | 0.7 | <0.05 | 0.05 |
| Ash (%) | 0.99 | <0.01 | 7.12 |
| Sulphur (%) | 0.36 | 0.20 | 1.02 |
| Carbon (%) | 83.14 | 84.62 | 81.76 |
| Hydrocarbon (%) | 12.96 | 13.27 | 11.75 |
| Nitrogen (%) | 0.12 | 0.05 | 0.28 |
| Oxygen (%) by diff. | 1.73 | 1.81 | (-1.98)* |
| Gross Heat of Combustion (BTU/lb) | 19159 | 19548 | 17957 |
| Specific Gravity | | | |
| @ 77°/77° F. | 0.8915 | 0.8525 | 0.965 |
| @ 60°/60° F. | 0.8955 | 0.8565 | 0.969 |
| API Gravity (calc) | 26.5 | 33.7 | 14.55 |
| Cloud Point (° F.) | T.D. | T.D. | T.D. |
| Pour Point (° F.) | 0 | -5 | +10 |
| Flash Point (° F.)** | 220 | 95 | >220 |
| Viscosity: | | | |
| @ 40° C. (cSt) | 68.0 | 7.42 | 251.5 |
| @ 50° C. (cSt) | 45.9 | 5.69 | 156.4 |
| @ 100° C. (cSt) | 11.13 | 2.18 | 25.14 |

T.D. = Too dark to observe
*The ash is very high for an oil sample and the ash components would be present as oxides, thereby seriously skewing the equation used to obtained "oxygen, by difference"
**Pensky-Martens Closed Cup The yield of reclaimed oil was approximately ninety percent. The product compared favourably to commercial light fuel oils with respect to elemental composition and calorific value. However, the viscosity pour point and flash point differed significantly from the corresponding values for commercial light fuels. This was attributed to distinct differences in composition. Commercial light fuels consist essentially of saturated paraffinic aliphatic hydrocarbons with a relatively narrow range of boiling points, while analysis of the reclaimed oil revealed that it contained a mixture of saturated and unsaturated aliphatic paraffinic hydrocarbons, with a very wide range of generally higher boiler points. It should be noted, however, that the cetane number of the reclaimed oil was very high, approximately 56, compared to the typical range of 40 to 45 of North American diesel fuels.

It will of course be appreciated that many variations of the apparatus and method of the present invention are possible.

Reference will now be made to FIGS. 4–13, which show a third embodiment in an apparatus in accordance with the present invention, generally denoted with the reference 100. The apparatus 100 includes a frame 102 supporting the various parts of the apparatus. Within the frame 102, there is a distillation or a evaporation unit 104, and a condensation unit or a heat exchanger 106. At 108, there are a variety of supply tanks and supply control equipment, detailed below and generally denoted by the reference 108.

Figure 6:
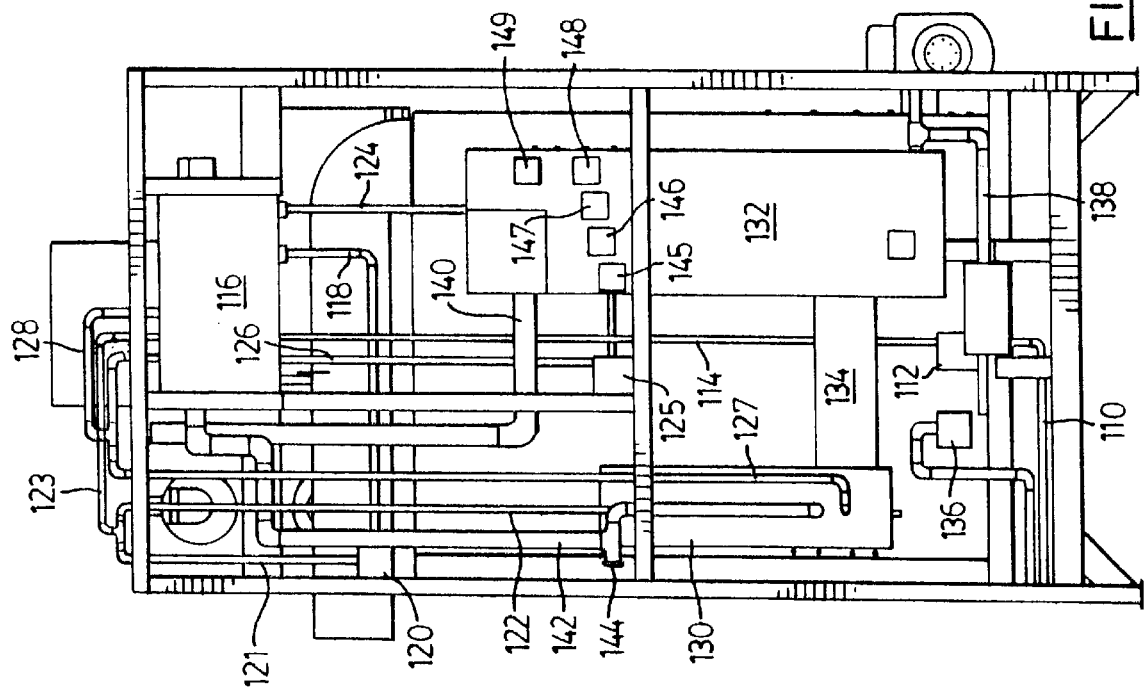

Dealing first with the supply equipment 108, this is best shown in FIG. 6. A waste oil supply pipe 110 is connected to a supply pump motor 112, which pumps the incoming waste oil up through a pipe 114 to a day or intermediate storage tank 116.

The day tank 116 is connected by pipe 118 to a first transfer pump 120, which is 3 gallon per hour supply pump. The pump 120 is in turn connected by pipes 121 and 122 to a service tank 130.

The day tank 116 has a second pipe 124 connecting it to a second transfer pump 125, which is in turn by pipes 126, 127 to the service tank 130.

To prevent siphoning of oil from the day tank 116 to the service tank 130, pipes 123 and 128 are provided for the first and second transfer pumps 120, 125 respectively. These pipes are connected to the day tank 116, to break any siphon that may be formed. They are high enough to prevent flow of oil back into the tank 116 when either one of the pumps 120 or 125 is operating. They are large enough to permit air/vapour from tank 116 to flow into the respective connecting pipes, to break any siphon that may form.

A float tank 132 is connected by a connection pipe 134 to the service tank 130. Although not shown this connection pipe would be a 3 inch diameter pipe including a steel gate valve, for controlling the flow.

A water removal pump 136 is provided in a line 138 connecting it to the float tank 132 for removing water that settles at the bottom of the float tank 132.

At the top of the float tank 132, there is a vapour exhaust line 140, which is connected to the condensation unit 106, as detailed below.

Additionally, the day tank 116 includes a pipe 142 including an overflow 144, connecting it to the service tank 130.

The float tank 132 is fitted with a variety of float switches, indicated at 145–149 and these are detailed below.

Figure 4:
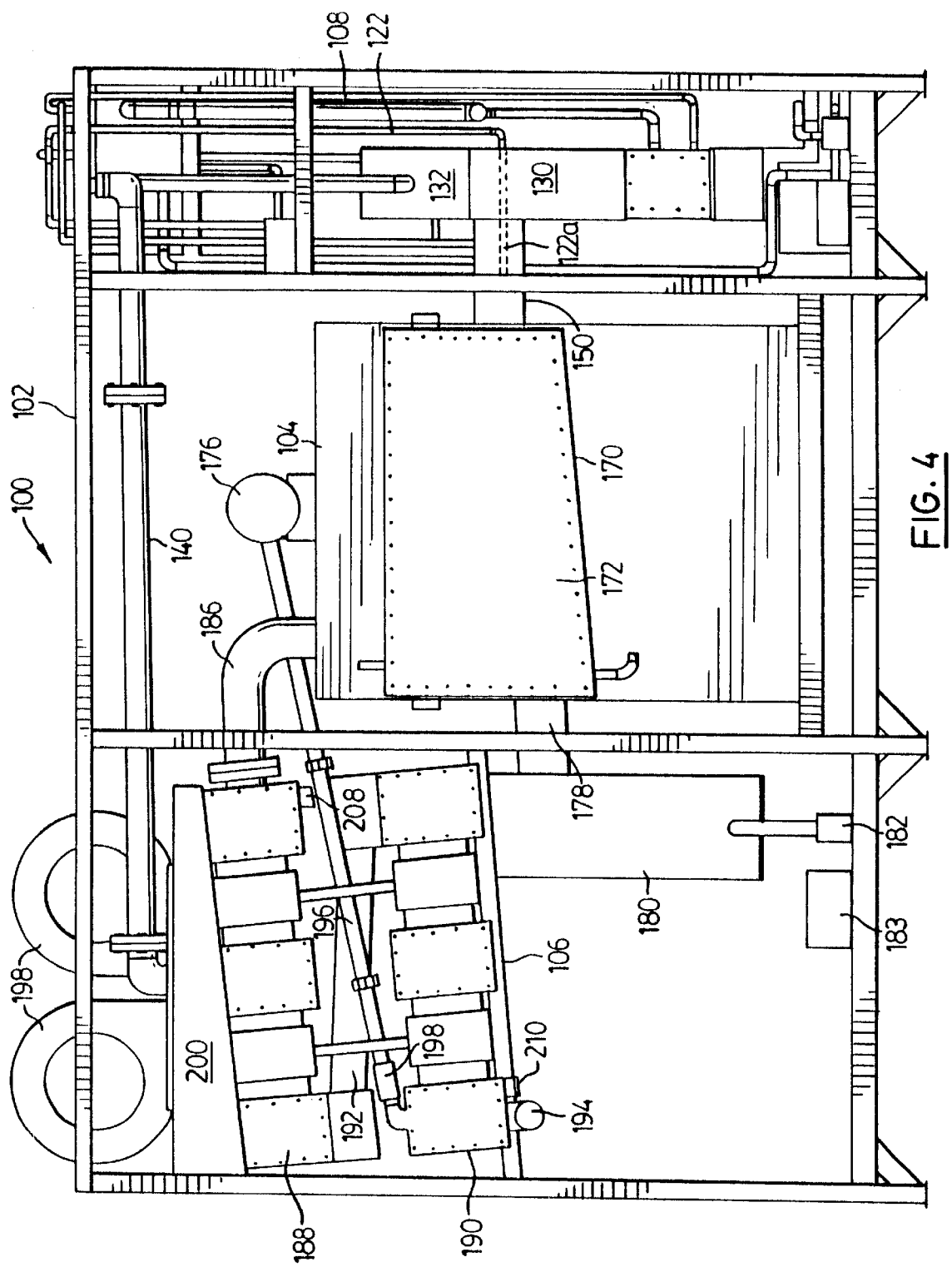
FIGS. 4, 5, 6 and 7 are respectively front, back, right and left side views of a second embodiment of the present invention.
Figure 8:
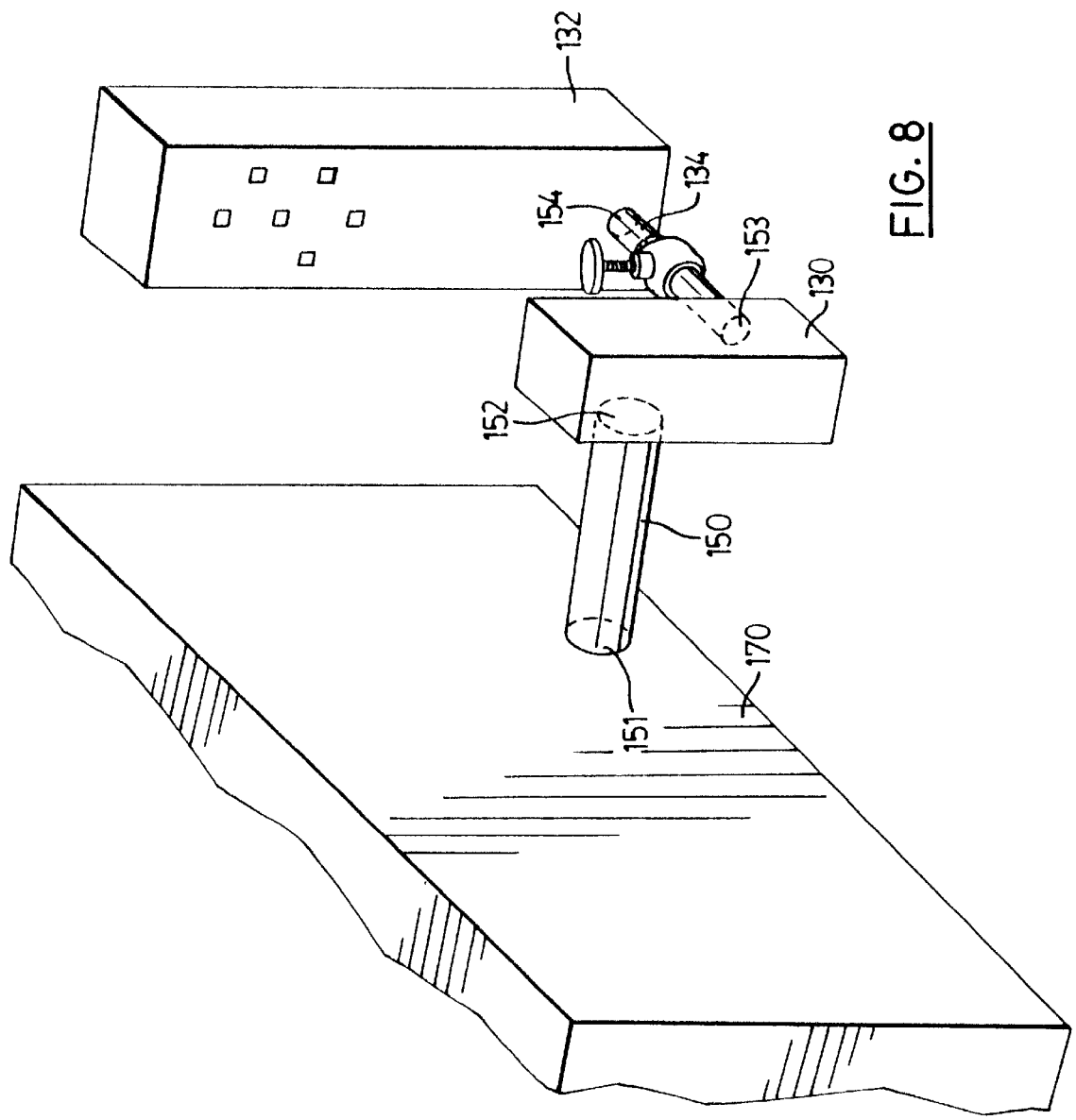
FIG. 8 is a schematic view showing locations of baffle plates.

As shown in FIGS. 4 and 8, the service tank 130 is connected by a pipe 150 to the distillation boiler or tank 170, which can be similar to the distillation tank 18 described with reference to FIG. 2.

To control the supply of oil, and prevent surges in the oil supply, a variety of baffles are provided between the service tank 130, and float tank 132 and the distillation boiler or tank 170. These will now be described with reference to FIGS. 8–12. As mentioned above, the pipe 134 is a three inch diameter pipe, and the supply pipe 150 is a six inch diameter pipe.

Many of these baffles are configured to prevent or reduce convective heat transfer between two bodies of oil at different temperatures. In particular, a first baffle is designed to minimize convective heat transfer between relatively hot oil in the tank 170 and oil in the pipe 150.

As shown in FIG. 8, a first baffle 151 is provided at the inlet to the tank 170, and a second baffle 152 is provided where the service tank 130 flows into the pipe 150. Similarly, third and fourth baffles 153, 154 are provided at either end of the connection pipe 134 adjacent the service and float tanks 130, 132 respectively.

Figure 9:
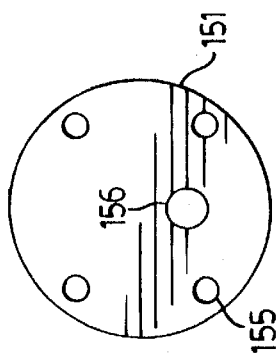
Figure 10:
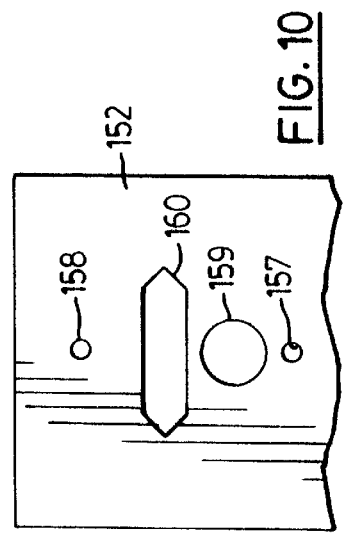

FIG. 9 shows the baffle 151. It is circular, with a diameter six inches. It has four ⅝ inch diameter holes around the outside, indicated at 155, and a hole or aperture 156, off-set from the centre. This aperture 156 is for a pipe 122a which is an extension of the pipe 122 from the first transfer pump 120. As shown in this FIG. 4, this extension of pipe 122a extends through the service tank 130 and the connection pipe 150 into the distillation tank 170.

Figure 11:
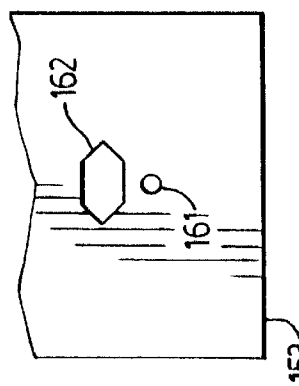
FIGS. 9, 10, 11 and 12 are details of individual baffle plates.
Figure 12:
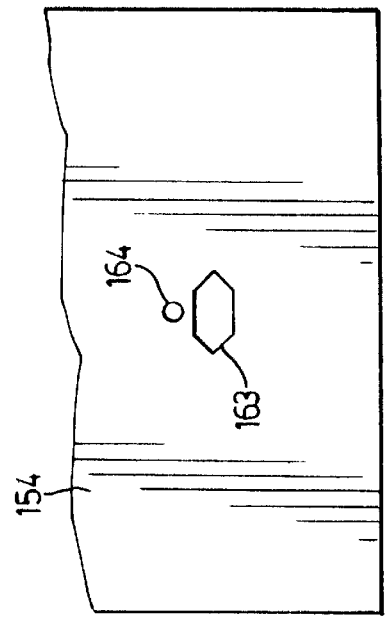

The second baffle 152 is provided at the top of a side wall of the service tank 130. At the top and bottom, it includes a drain hole 157 for liquid and a vent hole 158 for vapour, both having a diameter of ½ inch. Above the drain hole 157, there is an aperture 159, again for the extension pipe 122a. Above this there is a level port 160, which has a horizontal width of three inches and a height of one inch. The third baffle 153 into the service tank from the pipe 134 is shown in FIG. 11, and includes a ½ inch diameter drain hole 161, and above this a level port 162. The level port again has a height of one inch, but here has a horizontal width of two inches. It is expected that oil flow, or level adjustment will occur primarily through the level port 162, as for the other level ports.

Correspondingly, the fourth baffle 154 has a level port 163 with the same dimensions as the level port 162, and above this a ½ inch diameter vent port 164.

Figure 5:
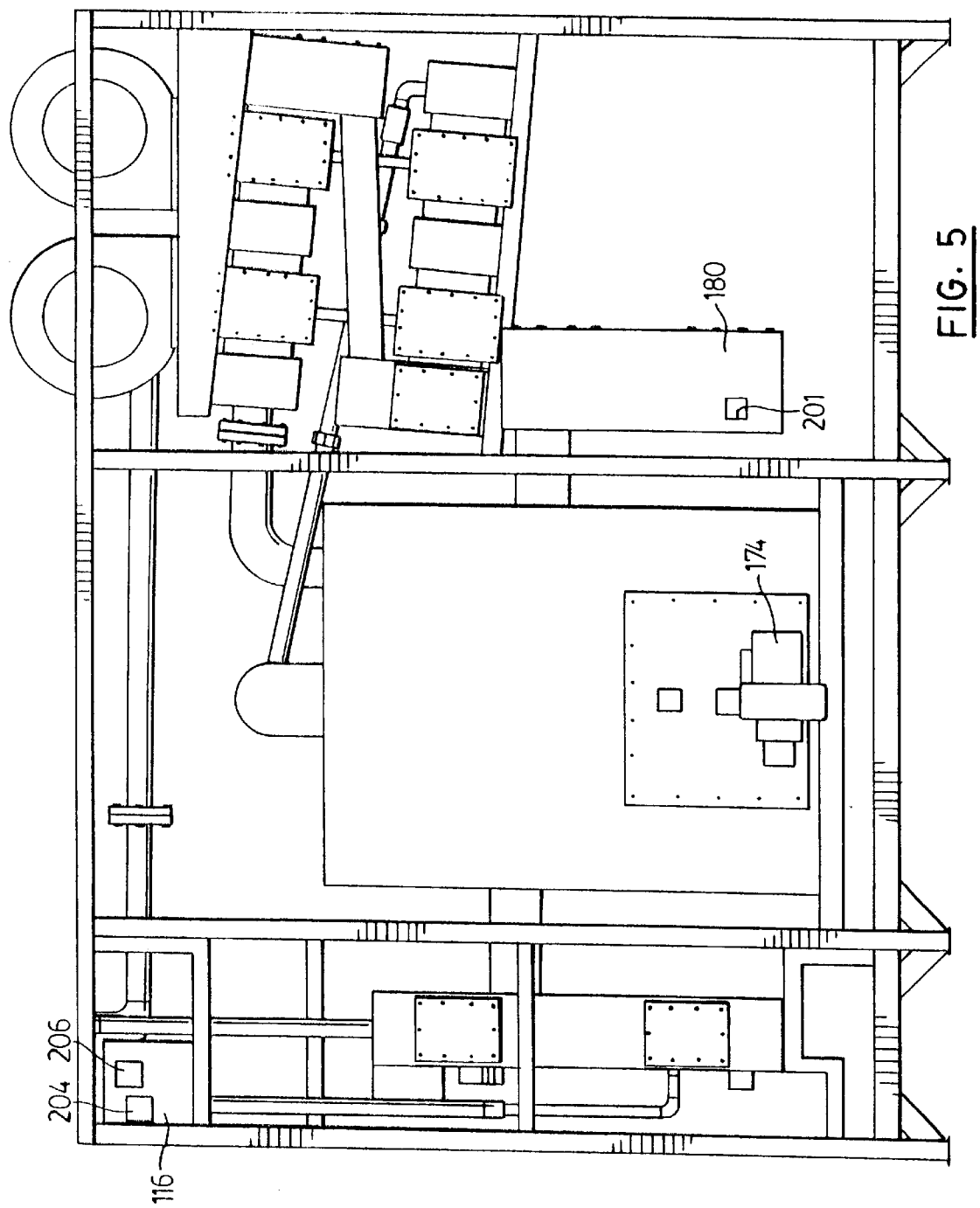
Figure 7:
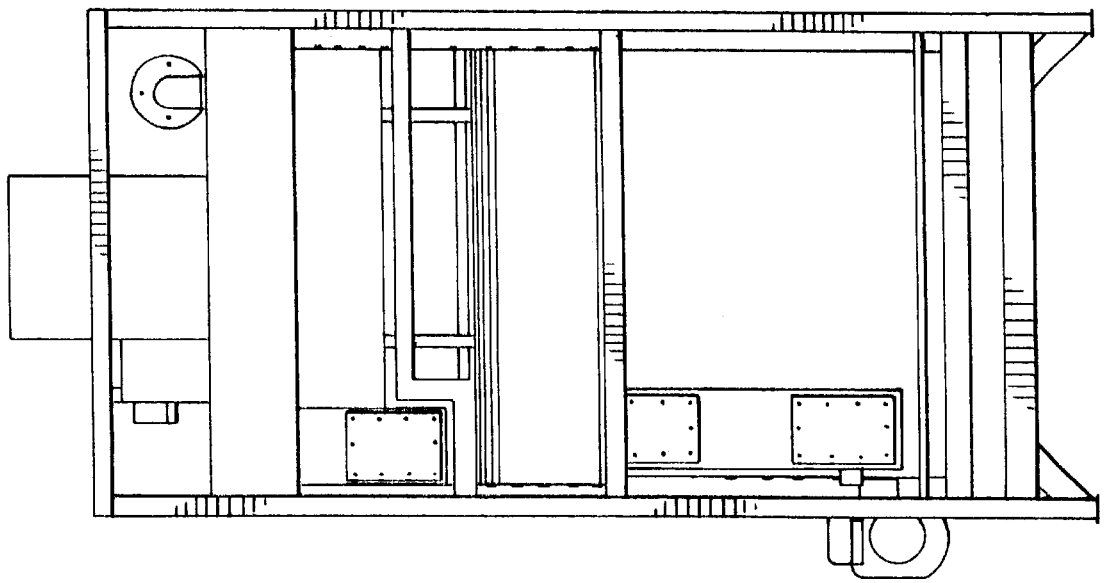

Turning to details of the distillation or unit 104, the distillation tank of boiler 170 includes a removable front cover plate 172, and as shown in FIG. 5, a blower unit 174 is provided for a burner to heat the tank 170. An exhaust outlet 176 could be connected to a conventional exhaust stack. The tank 170 has an outlet 178 connected to a sludge collection tank 180. The sludge collection tank 180 in turn is connected to a pump 182 with a DC motor 183, for emptying the sludge tank 180.

For vapour generated within the distillation tank of boiler 170, there is a vapour outlet 186 connected to the heat exchanger unit 106.

The heat exchanger 106 comprises first and second layers of ducts indicated at 188 and 190. Each layer of ducts 188 and 190 includes a number of rectangular-section transverse ducts, which are connected together at their ends, to form a zig zag path within each layer. The vapour outlet 186 is connected to the top of the first layer 188, which is inclined. A lower end of the layer 188 is connected by a transfer duct 192 to the upper end or the second layer 190. The lower end of the layer 190 includes, at the outlet of the last duct, an outlet 194 for recovery of condensed oil. This is connected to a recovered or reclaimed oil tank (not shown).

Additionally, there is a vent pipe 196 for any vapour still remaining. This is connected to the exhaust 176 for discharge.

As mentioned above a vapour exhaust pipe 140 is provided from the float tank 132 and is connected to the upper layer of ducts 188, for condensation of any vapour, any vapour that is not being condensed again being exhausted through the pipe 196 eventually.

For cooling the ducts 188, 190, fans 198 are provided. These fans are mounted on a hood 200, for directing the air flow over the duct layers 188, 190.

As shown in FIG. 5, a float switch 201 is mounted on the sludge tank 180. Also as shown in FIG. 5, there are two safety float switches 204, 206 on the day tank 116.

Referring to FIG. 4, a pair of snap discs 208 are mounted at the inlet of the first layer of heat exchange ducts 188, and a further snap disc 210 is mounted at the outlet of the lower layer of ducts 190, these snap discs being shown schematically.

It is to be appreciated that in most conventional distillation apparatus, vapour flows up through the apparatus, through succeeding sections of, for example, a distillation tower. Here the outlet of the distillation tank 170 is connected sideways to the heat exchanger 106, and in the heat exchanger 106 the vapour flow is generally downwards. The effect of this is to create a slight back pressure, of the order of 0.5 p.s.i., more particularly, in the range of 0.42–0.46 p.s.i. This in turn creates a slightly elevated temperature, around 25° C., which promotes cracking of heavier hydrocarbons. These pressures are so slight as to not cause the apparatus to be classified as pressure vessel, subject to various regulations.

Figure 13:
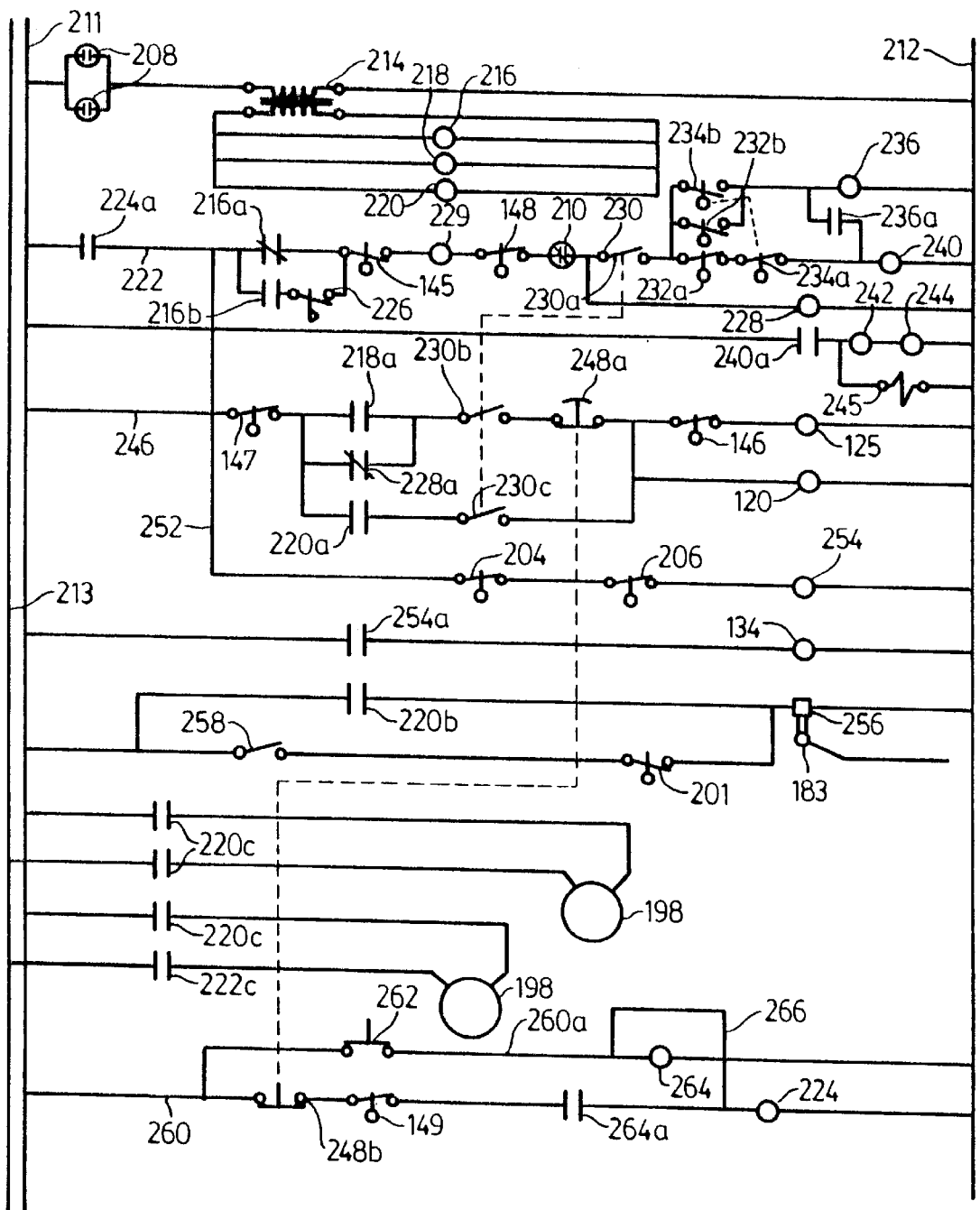
FIG. 13 is an electrical schematic of the second embodiment of the apparatus.

Reference will now be made to FIG. 13, which shows a control circuit for the apparatus 100. There are first and second supply lines 211, 212, in known manner, providing a 120 volt AC supply. The snap discs 208 are connected in parallel to an input coil of a transformer 214, connected between the supply lines. This transformer 214 converts the input supply to 24 volts, which is connected to three control relays 216, 218 and 220, which control various pairs of contacts detailed below. A line 222 includes a pair of contacts 224a of a control relay 224 detailed below.

Line 222 services as burner control circuit, and includes a normally closed pair of contacts 216a and a normally open contact pair 216b of the control relay 216. The contact pair 216b is connected in series with a sail switch 226, which in turn is connected to the low level float switch 145, which closes only when there is a sufficient oil level. The switch 145 is also connected to the contact pair 216a. Thus, with the relay 216 not actuated, current can flow directly to the low level switch 228. When the relay 216 is activated, which occurs when the fans are intended to be operating then the current flows through the line including the sail switch 226. The sail switch 226 thus provides a check to ensure that an adequate air flow exists.

A temperature controller 229 is provided for controlling the temperature maintained in the distillation tank or boiler 170. It is connected to the safety float switch 148, which in turn is connected to the snap disc 210. The safety float switch 148 opens the burner circuit, if the level in the float tank 132 exceeds a maximum level. The switch 148 is provided in case of surges. Such surges can arise due, for example, to water vapour in the distillation unit 104 causing excess pressure and forcing the oil level up in the float tank 132. The snap disc 210 opens above the temperature 130° F., and is used to ensure that the outlet of the heat exchanger does not reach too high a temperature.

A branch connection is then made through a control relay 228, controlling a contact pair 228a described below.

The line 222 continues through a switch 230, which includes contact pairs 230a, 230b and 230c. These are activated together, to turn on the burner circuit. Contacts 230a,b are normally open whilst contacts 230c are normally closed.

To allow for the surges in the flow through the device, two flow control float switches 232 and 234 are provided. switches 232 and 234 each include two pairs of contact 232a,b and 234a,b as indicated. The switch contacts 232b, 234b are connected to a timer 236 which controls contacts 236a. Although not shown in FIG. 4, the switches 232, 234 are fitted to a flow chamber at the outlet 194. This chamber has an outlet orifice sized for certain flow for a certain oil depth in the chamber, e.g. 80 GPH. When this flow rate is exceeded, the level rises, thereby activating at least one of the switches 232, 234. The switch contact pairs 232a, 234a are connected through to control relay 240. The switches 232, 234 thus supply power to the relay 240 in the absence of an excess flow. When an excess flow is detected by either one of these switches 232, 234 then the path to the relay 240 is interrupted and the timer 236 is actuated. The timer 236. is a twin timer that alternates between on and off periods, with the on period here being 30 seconds and the off period 5 seconds. During the on period, the contacts 236a are closed to supply power to relay 240. This has the effect of maintaining the burners operating part of the time to keep the tank 170 up to temperature, whilst simultaneously reducing the heat input and oil production sufficiently for the condensation unit 106 to clear.

The reason for this it has been found in practice that, particularly when starting up the apparatus, there can be surges in the flow through the apparatus. For example, when a volume of oil is first heated up, certain more volatile fractions can sass through the apparatus quite quickly. In this case, the timer 236 is used to avoid any problems due to this excess flow, whilst not shutting down the burners completely and letting the tank 170 cool down.

Relay 240 closes contact pair 240a. This supplies power through a CAD call 242 to a motor 244 for the fan or blower 174 for the distillation unit 104. It also supplies power to a delayed oil valve 245, which supplies combustion oil to the burner.

The transfer pumps 120, 125 are controlled through a line 246. This includes a high level float switch 147, which in effect controls the 3 GPX pump 120. This in turn is connected to contact pair 218a of the relay 218 and a contact pair 228a of the control relay 228. These contact pairs are then connected through one of the contact pairs 230b and then through contacts 248a of an emergency shut down switch 248. This in turn is connected to the float switch 146, mounted on the float tank 132, for actuating the 30 gal/h pump motor indicated at 125. There is a connection directly through to the 3 gal/h pump motor 120.

Further, the contact pair 220a of the control relay 220 is connected through the contacts 230c to the pump motors 120, 125, as shown.

Thus, with the switch 230, in a normal position, only the contacts 230c will be closed. Assuming that high level switch 147 is not opened, power could be supplied through the contact pair 220a to the pump motors 120, 125, which will only occur when the relays 216, 218, 220 are activated by a snap disc 208. The pump motor 12S would be shut off once the level set by the float 146 is reached. To turns on the burners, the switch 230 in operated, control of the power supply will be switched to contacts 218a, 228a. When the relays 218, 220 are activated and the burner circuit is activated, activating the relay 228, then the contacts 228a are opened and contacts 218a, 220a closed. This occurs when a sufficient temperature is reached at the heat exchanger 106, as sensed by the snap discs 208, which then activate the relays 216, 218 and 220. This results in the contact pairs 218a and 220a being closed. Power will then be supplied through one of these contact pairs to the pumps 120, 125.

The arrangement of contacts 218a, 220a and 228a is to permit operation of the pump 120 after the burners have been shutdown. Thus, during normal operation contacts 218a will initially be open and contacts 228a will be opened on burner start up. This enables the distillation unit 104 to heat up without further oil being added. As soon as vapour starts being produced in significant quantities, then the snap discs 208 activate the relay 218 closing contacts 218a and enabling the pumps 120, 125. The float switches 146, 147 then maintain the desired level. On shutdown, switch 230 is operated to close contacts 230c. Contacts 220a will remain closed whilst the fans 198 are operating, or whilst the relays 216–220 are activated. At this time the sludge pump 182 will be draining off sludge at the rate of approximately 2 GPM. The contacts 220a, 230c thus power the pump 120, which will maintain a steady flow of cool oil, whilst the apparatus cools, the pump being controlled by float switch 147. This prevents hot oil backing up into the service and float tanks as the apparatus cools.

The safety float switches 204, 206 are in a line 252 branched off through the burner control line 222. This line also includes a control relay 254, which controls contact pair 254a, controlling a half horse power motor of the supply pump 134.

The relay 220 also controls a contact pair 220b that activates the sludge pump motor 183. The sludge pump motor is a DC motor and this is supplied via a rectifier 256. Thus, once the snap discs 208 have closed for activating the fans etc. the sludge pump motor 183 should run continuously. There is also provided a sludge pump override or manual switch 258, which is connected in series with the sludge pump float switch 201 to the rectifier 256. Thus, this can be used to empty the sludge tank. The switch 258 would be closed and once the tank was emptied, the float switch 201 would turn off the sludge pump 183.

Motors for the fans 198 are supplied with power through contact pairs 220c of the relay 220, with the fans connected between line 212 and a further supply line 213 in known manner. Thus, once increasing temperature is detected by the snap discs 208, the fans will operate.

A burner activation line 260 includes a first branch 260a with a manual push button switch 262 and an actuating relay 264.

The second branch 260b includes contacts 248b of the emergency shut down switch 248, and the safety float switch 149. It further includes contacts 264a of the control relay 264 and a latching line 266. A relay 224 serves to close the contacts 224a for supplying power to the burner circuit.

The effect of the latching line 266 is to enable the relay 264 to be latch in a closed position. Provided power is supplied to the contacts 264a once the switch 262 is actuated, this actuates the relay 264, this in turn closes the contact 264a, ensuring the relay 264 maintains its actuated conditions through the latch line 266.

Figure 14:
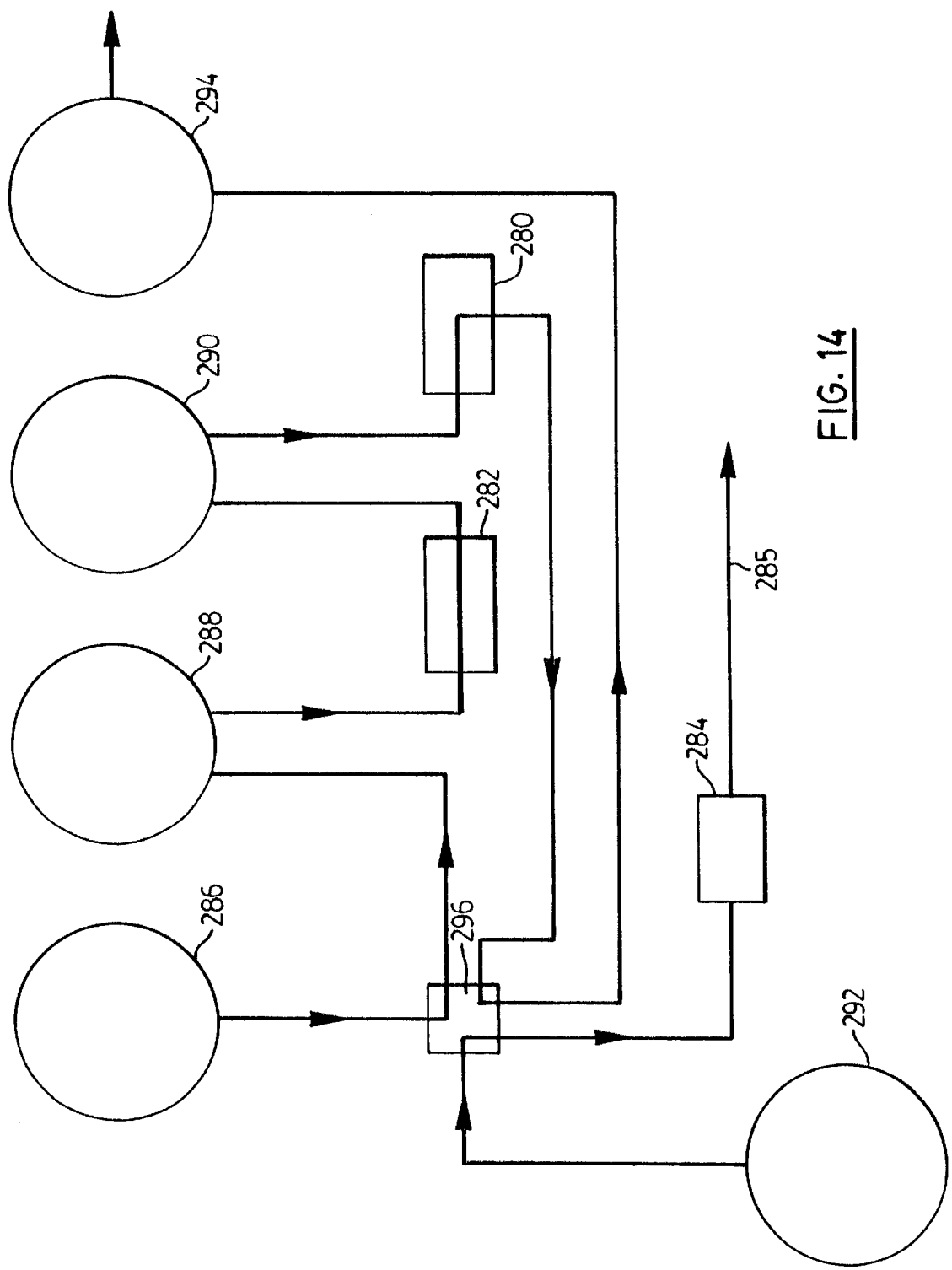
FIG. 14 is a schematic showing utilization of the present invention with other equipment.

Reference will now be made to FIG. 14 which shows the use of the apparatus with the present invention with other apparatus. In FIG. 14 the apparatus of the present invention is generally denoted as a refiner, with a reference 280. This could be an apparatus according any one of the embodiments of the present invention.

A preprocessor or sludge refining apparatus is shown at 282, and this is preferably an apparatus as described in my co-pending application No. 08/829,526, which has been filed simultaneously under the title Apparatus and Method for Reclaiming Useful Oil Products from Waste Oil. The contents of this application are hereby incorporated by reference.

At 284 there is shown an apparatus for separating or disjoining water and oil. This apparatus is preferably that described in a further co-pending application of mine, which has also been filed simultaneously herewith under the title Apparatus for Removing Contaminants from Water. Again the contents of this application are hereby incorporated by reference.

FIG. 14 also shows initial storage at 286, secondary storage at 288 and preprocessor storage at 290. At 292, there is storage for water contaminated with oil, and there is storage at 294 for final product, i.e. reclaimed and recovered oil. A centrifuge is shown at 296. In use, a variety of types of waste oil can be stored in the storage 286. The oil would first be passed through centrifuge 296, to remove solids, and then stored in the secondary storage 288. Although the centrifuging step could be omitted, as the preprocessor 282 effectively removes solids.

From there, the waste oil is fed through the apparatus 282, to further remove any solids and other materials still carried by the oil. The reason for first passing the waste oil through the apparatus 282, rather than the apparatus 280 of the present invention, is that the presence of solids significantly slows the operation of the apparatus of the present invention. Thus, if the waste oil, including solids first passes through of the apparatus 280, the throughput could be slowed down by as much as 35%, for example typically from 23 gal/hr to 15 gal/hr.

The oil with the solids removed is stored in the preprocessor storage 290, and then passed through the refiner 280.

The refined or reclaimed oil is then once again passed through the centrifuge 296, to remove tar and any remaining solids. If required, the flash point would be adjusted. It is then stored at 294, before shipping to market or the final user.

As indicated at 292, water contaminated with oil can be handled. The contaminated water is first passed through the centrifuge 296 again to remove any solids that it may contain. Again, this step is optional, since solids are effectively removed in the water-oil disjoiner 284. It is then passed through the apparatus for removing oil-based contaminants indicated at 284. In this apparatus, any combustible material, including oil or oil-based products, are consumed by combustion, to leave water which is clean enough to meet most regulatory limits for discharge. Accordingly, at 285, the clean water is discharged. It can be noted that the clean water has been heated, and the heat can possibly be recovered for various uses.

Any water that is present in initial waste oil, delivered to the initial storage at 286, is separated, and passed through the water oil separator oil 292.

Further, debris, sludge or tar recovered by the centrifuge is fed through the apparatus 282, for final processing, and to recover any oil-based material that may be present.

The overall products of the equipment or plant shown in FIG. 13 comprise a clean fuel oil collected at 294, clean water at 285, and a black cakey solid that is residue collected in the apparatus 282. This solid typically contains recoverable amounts of various metals that have commercial value. Typical Figures are: Zinc 13%; phosphorous 12.7%; Magnesium 7.7%; Calcium 7.7% and Lead 6.7%. The strategic metal molybdenum is typically present at 8.2 pounds per ton solid.

A further series of tests as carried out (by OCL Services Ltd. of Dartmouth, Nova Scotia, Canada) with a general objective of determining if operation of the apparatus would generate emissions having a serious environmental impact. As detailed below, the tests started with a waste oil which meet current Waste Oil Regulations, at least in Canada, and found that the process generated only one end-product waste stream which could possibly be classified as an environmental hazard. This was an ash cake solid waste from the apparatus of the present invention. It was further determined that this ash cake is not leachable, and hence, could be classified as toxic non-leachate, as detailed below.

The following table 3 shows the analysis of the initial product, listing a typical waste oil.

TABLE 3

Analysis of Initial Raw Product

| Item | Value | Units |
|---|---|---|
| PCB (as Aroclor 1260) | <1 | mg/kg |
| Arsenic | <0.05 | mg/kg |
| Lead | 20.8 | mg/kg |
| Cadmium | 0.46 | mg/kg |
| Chromium | 1.4 | mg/kg |
| Zinc | 757 | mg/kg |
| Sediment, toluene fraction | 4.21 | % |
| Ash | 0.56 | % |
| Organic chloride | 382 | mg/kg |
| Pinsky-Martens Flash Point; boils @ | 100 | ° C. |
| Water content (side arm) | 3.0 | % |
| Specific Gravity @ 60° F. | 0.8860 | — |
| Sulphur | 0.56 | % |
| Odour | solvent (possibly varsol) | |

Distillation

| | | | |
|---|---|---|---|
| Initial BP: 100° C. | 10% (188° C.) | 20% (280° C.) | 30% (310° C.) |
| | 40% (321° C.) | 50% (327° C.) | 60% (328° C.) |
| | 70% (328° C.) | 80% (324° C.) | 90% (320° C.) |
| | end point reached at 328° C. with 60% recovered | | |

A comparison of this analysis with Waste Oil Environmental Criteria (Canadian Standards) shows that the oil meets the environmental criteria in all respects. The concentration of PCBs was less than 1 mg/kg (Criterion equals 5 mg/kg). Concentrations of the metals were low and also met the relevant criteria.

Table 4 shows an analysis of the residual solids or ash cake produced by the preprocessor 282. As shown, the cake was analyzed for 5 trace metals. As expected, the metal contaminants in the original feedstock were concentrated in the ash cake residue, particularly the lead and zinc. Concentrations were high, and in all likelihood, the ash could be considered a hazardous material.

Accordingly, a standard leachate test, as defined in the Canadian Transport of Dangerous Goods Act was carried out. These results are shown in table 5.

TABLE 4

Residual Solids Analysis

| Item | Ash Cake #1 | Ash Cake #2 | Centrifuge Sludge #1 | Units |
|---|---|---|---|---|
| Arsenic | 2.50 | 0.19 | 0.34 | mg/kg |
| Lead | 1160 | 747 | <1.5 | mg/kg |
| Cadmium | 32.2 | 27.8 | <0.20 | mg/kg |
| Chromium | 110 | 87.2 | <0.50 | mg/kg |
| Zinc | 35,900 | 61,728 | 0.64 | mg/kg |

TABLE 5

Leachate Test of Ash Cakes

| Item | Ash Cake #1 | Ash Cake #2 | Leachate Criteria | Units |
|---|---|---|---|---|
| pH | 4.10 | 4.05 | — | — |
| Arsenic | <0.005 | <0.005 | 5.0 | mg/L |
| Lead | <0.30 | <0.30 | 5.0 | mg/L |
| Cadmium | <0.01 | <0.1 | 5.0 | mg/L |
| Chromium | <0.10 | <0.10 | 0.50 | mg/L |
| Zinc | 1.8 | 1.9 | no value | mg/L |

The leachate results are well within the criteria of that Act, and hence the material can be classified as a non-toxic leachate.

It can be noted that the trace metal content in the ash cake will be a function of the feed stock and accordingly, there are likely to be significant differences depending upon the raw oil input.

Table 6 shows a different product analysis for a treated product, produced by the preprocessor 282.

TABLE 6

Refined Product Analysis

| Item | Pre-Processed Oil Test #1 † (1674-6) | Pre-Processed Oil Test #2 ‡ (1674-1) | Units |
|---|---|---|---|
| Flash Point | 94.0 | <0, 111 | ° C. |
| Viscosity @ 20° C. | 11.8 | 5.26 | centistoke |
| Calorific Value | 19,228 | 19,547 | Btu/lb |
| Elemental Analysis | | | |
| H | 12.85 | 12.57 | % |
| C | 86.62 | 86.27 | % |
| N | 0.06 | 0.01 | % |
| O | 0.42 | 1.09 | % |
| S | 0.29 | 0.32 | % |
| Ash @ 775° C. | <0.005 | <0.005 | % |
| Arsenic | 0.21 | 0.25 | mg/kg |
| Lead | <1.0 | 2.0 | mg/kg |
| Chromium | <1.0 | <1.0 | mg/kg |
| Cadmium | <0.2 | <0.2 | mg/kg |
| Zinc | — | <0.2 | mg/kg |
| Colour (D1500/96 ASTM) | <3.0 oil | 4.0 oil | — |
| Burning carbon residue | 0.051 | 0.045 | % |
| Pour point | −16 | −21 | ° C. |
| Odour | burnt | burnt | — |
| PCB (as Aroclor 1260) | <1 | 4.8 | mg/kg |
| Total organic chlorides | <60 | 338 | mg/kg |
| Water content | <0.05 | <0.05 | % |
| Distillation Range | | | |
| initial BP | 200 | 60 | ° C. |
| 10 mL | 236 | 162 | ° C. |
| 20 mL | 267 | 205 | ° C. |
| 30 mL | 294 | 244 | ° C. |
| 40 mL | 315 | 284 | ° C. |
| 50 mL | 331 | 315 | ° C. |
| final BP | 331 | 328 | ° C. |
| recovery | 63.0 | 61.0 | % |

† test #1 represents material centrifuged and adjusted for flash point
‡ test #2 represents material only centrifuged. Result for flash point shows result before and after flash point adjustment.

Test No. 1 shows the material that was subsequently centrifuged and adjusted, by the applicant, as it was realised that the oil had a relatively low flash point. This gave a flash point of 94° C. Test No. 2 shows oil which was just centrifuged, without flash point adjustment. The flash point was then adjusted. Two flash point figures are given, before and after adjustment, showing an increase in flash point from less than 0° C. to 111° C. Environmentally, this is of no great significance, but it does affect the classification of the oil and conditions under which it would have to be transported.

The sludge by-product generated by centrifuging was also tested and met relevant environment criteria. This sludge could be input back into the preprocessor 282 for further processing.

The characteristics of the oil set out in table 6 is equivalent to a No. 5 fuel oil, in accordance with ASTM Standards, and accordingly, this product could be used as such.

Reclaimed oil from the preprocessor 282 and a sample of the original waste oil were passed through the apparatus of the present invention. Results of this testing are shown in Table 7 below.

TABLE 7

Refined Product Analysis

| Item | Raw Oil Through Refiner (1674-3) | Pre-Processed Oil Through Refiner (1674-4) | Units |
|---|---|---|---|
| Flash Point | 124 | 92.0 | ° C. |
| Viscosity @ 20° C. | 8.43 | 15.6 | centistoke |
| Calorific Value | 19,472 | 19,563 | Btu/lb |
| Elemental Analysis | | | |
| H | 12.77 | 12.73 | % |
| C | 86.15 | 86.28 | % |
| N | 0.04 | 0.03 | % |
| O | 0.79 | 0.91 | % |
| S | 0.20 | 0.20 | % |
| Ash @ 775° C. | <0.005 | <0.005 | % |
| Arsenic | 0.21 | 0.19 | mg/kg |
| Lead | <1.4 | <1.0 | mg/kg |
| Chromium | <1.0 | <1.0 | mg/kg |
| Cadmium | <0.2 | <0.2 | mg/kg |
| Zinc | 1.6 | 3.0 | mg/kg |
| Colour (D1500/96 ASTM) | <4.5 oil | <4.5 oil | — |
| Burning carbon residue | 0.082 | 0.073 | % |
| Pour point | −16 | −18 | ° C. |
| Odour | burnt | burnt | |
| PCB (as Aroclor 1260) | 3.9 | <1 | mg/kg |
| Total organic chlorides | <60 | 204 | mg/kg |
| Water content | <0.05 | <0.05 | % |
| Distillation Range | | | |
| initial BP | 230 | 207 | ° C. |
| 10 mL | 265 | 234 | ° C. |
| 20 mL | 286 | 255 | ° C. |
| 30 mL | 304 | 273 | ° C. |
| 40 mL | 319 | 242 | ° C. |
| 50 mL | 330 | 310 | ° C. |
| final BP | 330 | 333 | ° C. |
| recovery | 72.0 | 72.0 | % |

No unacceptable contamination was noted in either liquid. Metal concentrations were low, and concentrations of the contaminants were low and acceptable.

The output of the apparatus of the present invention produces an oil product whose characteristics are close to a No. 2 diesel fuel. The production rate depends on the feed characteristics. If the feed is the No. 5 fuel oil product from the preprocessor 282, then the rate is approximately 23 Canadian gallons per hour; if the feed is waste oil, the oil product production rate is 15 Canadian gallons per hour. The sludge produced by the apparatus of the present invention could be fed as an input to the preprocessor 282, for producing further oil product and the solid cake material.

For these tests, the process heat was supplied by burners comparable to those used in domestic oil furnaces. The fuel was oil produced from the apparatus or refiner 280. The preprocessor 282 had two opposing burners, each fitted with a 4 USgph nozzle, whilst the burner 280 had a single burner rated at 1.75 USgph During testing, the output of the stack or exhaust was monitored. It was shown that CO emissions were low, indicating a high burner efficiency.

The SO2 emission factors were about 4 g/Kg indicate a sulphur content in the fuel of 0.2%, which is consistent with the analytical result in 0.26% sulphur as an average value for the fuel which is burned.

The amount of particulate collected was very low, and was probably due to the fact that the oil itself has less than 0.01% ash, and the burners were run at relatively high excess air. No visible smoke was produced in the stack. By comparison, particulate emissions from industrial, well-controlled wood burners are much higher ranging from 0.5 to 15 g/Kg.

There was no discernable odour on the site. The readings from a "sniffer" were all below 0.5 ppm. As a reference point, the sniffer was placed near the opening of an oil barrel, where there is a definite hydrocarbon odour. Readings at this point were in the 5–10 ppm range.

Finally, although the electrical schematic shows a variety of relays, etc. for implementing the control functions, many of these could be replaced by a Programmable Logic Controller (PLC). A suitable PLC is an Omron C40, and the following Table 8 gives the programming for the PLC.

TABLE 8

| ADDRESS | MNEMONIC | | OPERAND | | COMMENT |
|---------|----------|-----|---------|-----|---------|
| 00000 | LD | | | 00002 | START |
| 00001 | LD | NOT | | 00003 | SAFETY RESET |
| 00002 | KEEP | | | 00303 | |
| 00003 | LD | | | 00303 | SAFE |
| 00004 | AND | | | 00004 | DAY TANK FLOAT |
| 00005 | TIM | | | 001 | |
| | | | # | 0200 | |
| 00006 | LD | | | 00303 | SAFE |
| 00007 | AND | | | 00005 | DAY TANK FLOAT |
| 00008 | AND | | | 00004 | DAY TANK FLOAT |
| 00009 | AND | | | 00011 | SURG |
| 00010 | AND | NOT | TIM | 001 | SP TIMER |
| 00011 | OUT | | | 00100 | SP OUT |
| 00012 | LD | NOT | | 00006 | F130 |
| 00013 | OR | | | 00007 | SAIL SW |
| 00014 | AND | | | 00303 | SAFE |
| 00015 | AND | | | 00015 | SEL SW |
| 00016 | AND | | | 00008 | LLFS |
| 00017 | AND | | | 00009 | L130 |
| 00018 | AND | | | 00010 | TEMP |
| 00019 | AND | NOT | | 00012 | FLOW CONTROL |
| 00020 | AND | NOT | TIM | 001 | SP TIMER |
| 00021 | LD | | | 00303 | SAFE |
| 00022 | AND | | | 00007 | SAIL SW |
| 00023 | AND | | | 00008 | LLFS |
| 00024 | AND | | | 00009 | L130 |
| 00025 | AND | | | 00010 | TEMP |
| 00026 | AND | | | 00011 | SURG |
| 00027 | AND | | | 00015 | SEL SW |
| 00028 | AND | | TIM | 003 | FLOW TIM |
| 00029 | OR | LD | | | |
| 00030 | OUT | | | 00101 | BURNER CONTROL |
| 00031 | LD | | TIM | 003 | FLOW TIM |
| 00032 | TIM | | | 002 | |
| | | | # | 0400 | |
| 00033 | LD | | | 00006 | F130 |
| 00034 | OR | | | 00200 | SLUDGE OVR |
| 00035 | AND | | | 00303 | SAFE |
| 00036 | OUT | | | 00102 | SLUDGE PUMP |
| 00037 | LD | NOT | | 00008 | LLFS |
| 00038 | OR | | | 00006 | F130 |
| 00039 | AND | | | 00303 | SAFE |
| 00040 | AND | | | 00015 | SEL SW |
| 00041 | AND | NOT | TIM | 001 | SP TIMER |
| 00042 | AND | | | 00013 | HLFS |
| 00043 | AND | | | 00014 | 30 GPH FLOAT |
| 00044 | OUT | | | 00103 | 30 GPH OUTPUT |
| 00045 | LD | | | 00303 | SAFE |
| 00046 | AND | | | 00006 | F130 |
| 00047 | AND | | | 00013 | HLFS |
| 00048 | AND | NOT | TIM | 001 | SP TIMER |
| 00049 | AND | | | 00014 | 30 GPH FLOAT |
| 00050 | OUT | | | 00104 | 30 GPH OUTPUT |
| 00051 | LD | NOT | | 00008 | LLFS |
| 00052 | OR | | | 00006 | F130 |
| 00053 | AND | | | 00303 | SAFE |
| 00054 | AND | | | 00015 | SEL SW |
| 00055 | AND | NOT | TIM | 001 | SP TIMER |
| 00056 | AND | | | 00013 | HLFS |
| 00057 | OUT | | | 00105 | 3 GPH OUTPUT |

TABLE 8-continued

| ADDRESS | MNEMONIC | | OPERAND | | COMMENT |
|---------|----------|-----|---------|-----|---------|
| 00058 | LD | | | 00303 | SAFE |
| 00059 | AND | | | 00006 | F130 |
| 00060 | AND | NOT | TIM | 001 | SP TIMER |
| 00061 | AND | | | 00013 | HLFS |
| 00062 | OUT | | | 00106 | 3 GPH OUTPUT |
| 00063 | LD | | | 00006 | F130 |
| 00064 | OUT | | | 00301 | FAN CONTROL |
| 00065 | LD | | TIM | 001 | SP TIMER |
| 00066 | OUT | | | 00111 | |
| 00067 | LD | | | 00202 | |
| 00068 | LD | NOT | | 00003 | SAFETY RESET |
| 00069 | KEEP | | | 00302 | |
| 00070 | END | | | | |

I claim:

1. A method for treating waste oil containing contaminants, the method comprising the steps of:
   (a) heating said waste oil;
   (b) at substantially atmospheric pressure, volatilizing a first portion of said waste oil, at a temperature sufficient to cause cracking of at least part of said first portion, said first portion containing primarily the lighter hydrocarbons of said waste oil, and separating the volatilized first portion from the remaining unvolatilized portion of said waste oil, said remaining portion containing primarily the heavier hydrocarbons and the contaminants of said waste oil;
   (c) condensing said separated, volatilised first portion; and
   (d) recovering said condensed first portion, substantially reduced in contaminants and having a substantially lower viscosity than said waste oil, and separately recovering said remaining portion.

2. A method as recited in claim 1, wherein step (a) is carried out at a temperature in the range 600–800° F.

3. The method as recited in claim 1, wherein said temperature in step (a) is in the range of 635 to 650° F.

4. The method as recited in claim 3, wherein said temperature is 650° F.

5. The method as recited in claim 1, 2, 3 or 4, wherein said temperature is effective such that said volatilized first portion is nine-tenths of said waste oil.

6. The method as recited in claim 1, 2, 3 or 4, wherein the waste oil is heated at a pressure in the order of 0.5 p.s.i. above atmospheric pressure.

7. The method as recited in claim 1, wherein steps (a), (b) and (c) are conducted in a single vessel having an inclined base with barriers extending upwardly therefrom such that said volatilized first portion passes over said barriers, while said remaining portion flows down said inclined base around said barriers.

8. The method as recited in claim 1, 2, 3 or 4 further comprising the step of burning part of said useful oil product recovered in step (d), to accomplish at least a part of the heating step (a).

9. A method as claimed in claim 1, further comprising monitoring the flow of condensed oil and adjusting the heating according to the monitored flow rate.

10. A method as claimed in claim 9, wherein when an excess flow of condensed oil is detected, heating in step (a) is interrupted periodically, to reduce heating while maintaining the temperature of the heated waste oil.

11. A method as claimed in claim 1, 9 or 10, wherein the level of waste oil in the vessel is monitored, and waste oil is supplied continuously to the vessel, to maintain the waste oil level between set upper and lower limits, and wherein the method is interrupted if the waste oil level exceeds those upper and lower limits.

12. A method as claimed in claim 11, when carried out in a vessel connected to a separate float tank, subject to waste oil level within the vessel, wherein the waste oil level is monitored in the float tank, externally from the vessel.

13. A method as claimed in claim 1, further comprising condensing the first portion in a condenser and cooling the condenser by fan means, and activating the fan means in dependence upon the temperature in the condenser.

14. A method as claimed in claim 13, further comprising monitoring the temperatures at the inlet and the outlet of the condenser, activating the fan means in dependence upon the temperature at the inlet of the condenser and interrupting the heating in step (a) in dependence upon the temperature at the outlet of the condenser.

15. A method as claimed in claim 13, further comprising, after activation of the fans, monitoring air flow from the fans and interrupting heating of the waste oil if this air flow is insufficient.

16. A method as claimed in claim 15, further comprising monitoring the temperature of the outlet of the condenser, and varying the heating in step (a) in dependence upon that temperature at the outlet of the condenser.

17. A method for treating waste oil containing contaminants, the method comprising the steps of:

(a) heating the waste oil;

(b) in a vessel, volatilizing a first portion of said waste oil, at a temperature sufficient to cause cracking of at least part of said first portion, said first portion containing primarily the lighter hydrocarbons of said waste oil and separating the volatilized first portion from the remaining unvolatilized portion of said waste oil, said remaining portion containing primarily the heavier hydrocarbons and the contaminants from said waste oil, while not subjecting the vessel to any pressure regimes substantially different from atmospheric pressure and enabling the vessel to be subject to substantially atmospheric pressure;

(c) condensing said separated, volatilised first portion; and (d) recovering said condensed first portion, substantially reduced in contaminants and having a substantially lower viscosity than said waste oil, and separately recovering said remaining portion;

wherein the first portion comprises a major part of the original waste oil, with the remaining portion comprising a minor part of the original waste oil and having solid contaminants concentrated therein.

18. A method as claimed in claim 1 or 17, wherein said waste oil comprises waste lubricating oil, and wherein the first portion in step (b) comprises a fuel oil of at least grade 5 in accordance with ASTM standards.

* * * * *